United States Patent [19]
Payne

[11] Patent Number: 5,860,390
[45] Date of Patent: *Jan. 19, 1999

[54] LIVESTOCK FEEDER

[75] Inventor: Joe L. Payne, Kaw, Okla.

[73] Assignee: Century Livestock Feeders, Inc., Kaw, Okla.

[*] Notice: The term of this patent shall not extend beyond the expiration date of Pat. No. 5680,829.

[21] Appl. No.: 921,458

[22] Filed: Aug. 25, 1997

Related U.S. Application Data

[63] Continuation of Ser. No. 605,407, Feb. 22, 1996, Pat. No. 5,680,829.

[51] Int. Cl.$^6$ .................................................. A01K 5/00
[52] U.S. Cl. .................................................. 119/53
[58] Field of Search .................... 119/53, 53.5, 54, 119/55, 61, 59

[56] References Cited

U.S. PATENT DOCUMENTS

| | | | |
|---|---|---|---|
| 1,203,865 | 11/1916 | Fair . | |
| 2,933,062 | 4/1960 | Geerlings | 119/53 |
| 3,233,590 | 2/1966 | Venca | 119/53 |
| 3,547,082 | 12/1970 | Blessin et al. | 119/53 |
| 3,648,661 | 3/1972 | Moore | 119/53 |
| 3,851,624 | 12/1974 | Peak | 119/60 |
| 3,906,903 | 9/1975 | Vandewater | 119/60 |
| 4,324,202 | 4/1982 | Stonestreet et al. | 119/51 |
| 4,488,510 | 12/1984 | Lundgren, Sr. | 119/60 |
| 5,337,699 | 8/1994 | Dyson | 119/60 |
| 5,680,829 | 10/1997 | Payne | 119/53 |

FOREIGN PATENT DOCUMENTS

| | | |
|---|---|---|
| 1013221 | 7/1977 | Canada . |
| 823803 | 11/1959 | United Kingdom . |

OTHER PUBLICATIONS

Warner's Specification, No. 711, Feb. 18, 1880.
Page from "Hoofbeats" publication, Feb., 1968.

*Primary Examiner*—Thomas Price
*Attorney, Agent, or Firm*—Dunlap, Codding & Rogers, P.C.

[57] ABSTRACT

A self-standing livestock feeder for holding salt, minerals, grain, and the like. The livestock feeder includes a plurality of leg members constructed of a polymeric material, a circularly-shaped trough constructed of a polymeric material, and a feed storage bin constructed of a tubular polymeric material. The trough and the feed storage bin are supported on the legs by a polymeric support ring. The feed storage bin has at least one feed dispensing opening disposed through the feed storage bin at the lower end thereof to permit gravitational flow of feed from the feed storage bin into the trough via the feed dispensing openings whereby such feed is accessible to livestock.

15 Claims, 2 Drawing Sheets

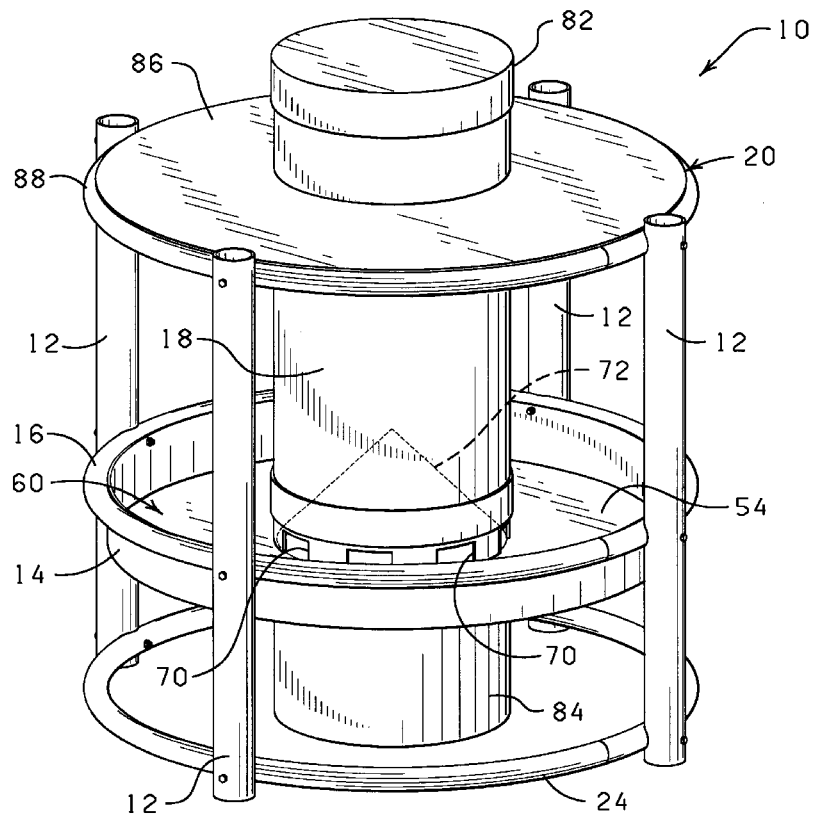
Fig. 1
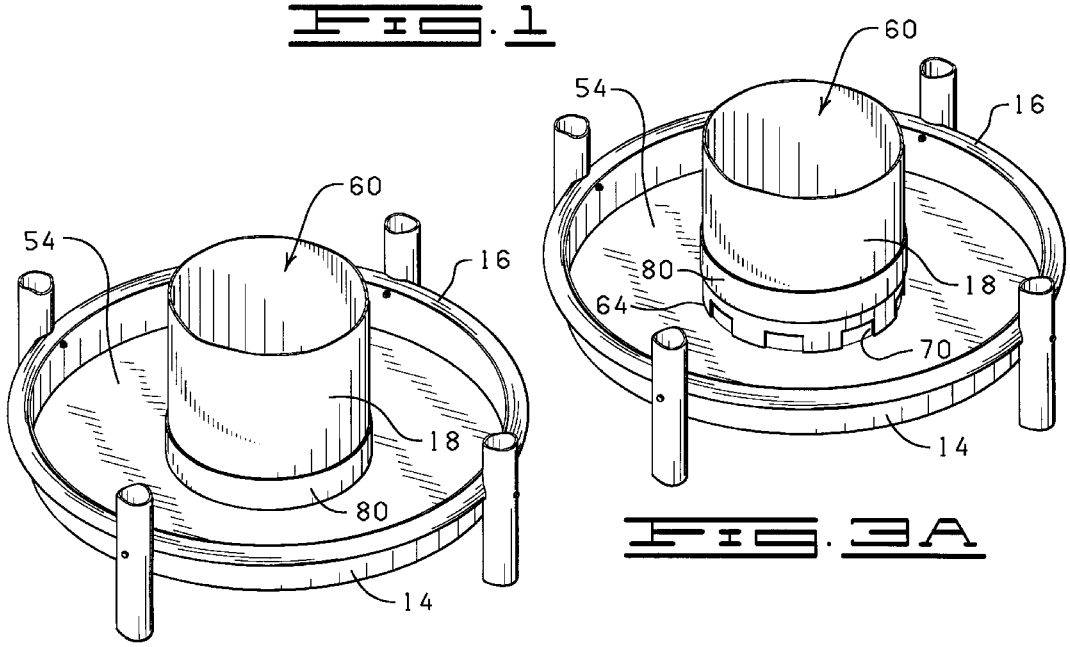
Fig. 3B
Fig. 3A

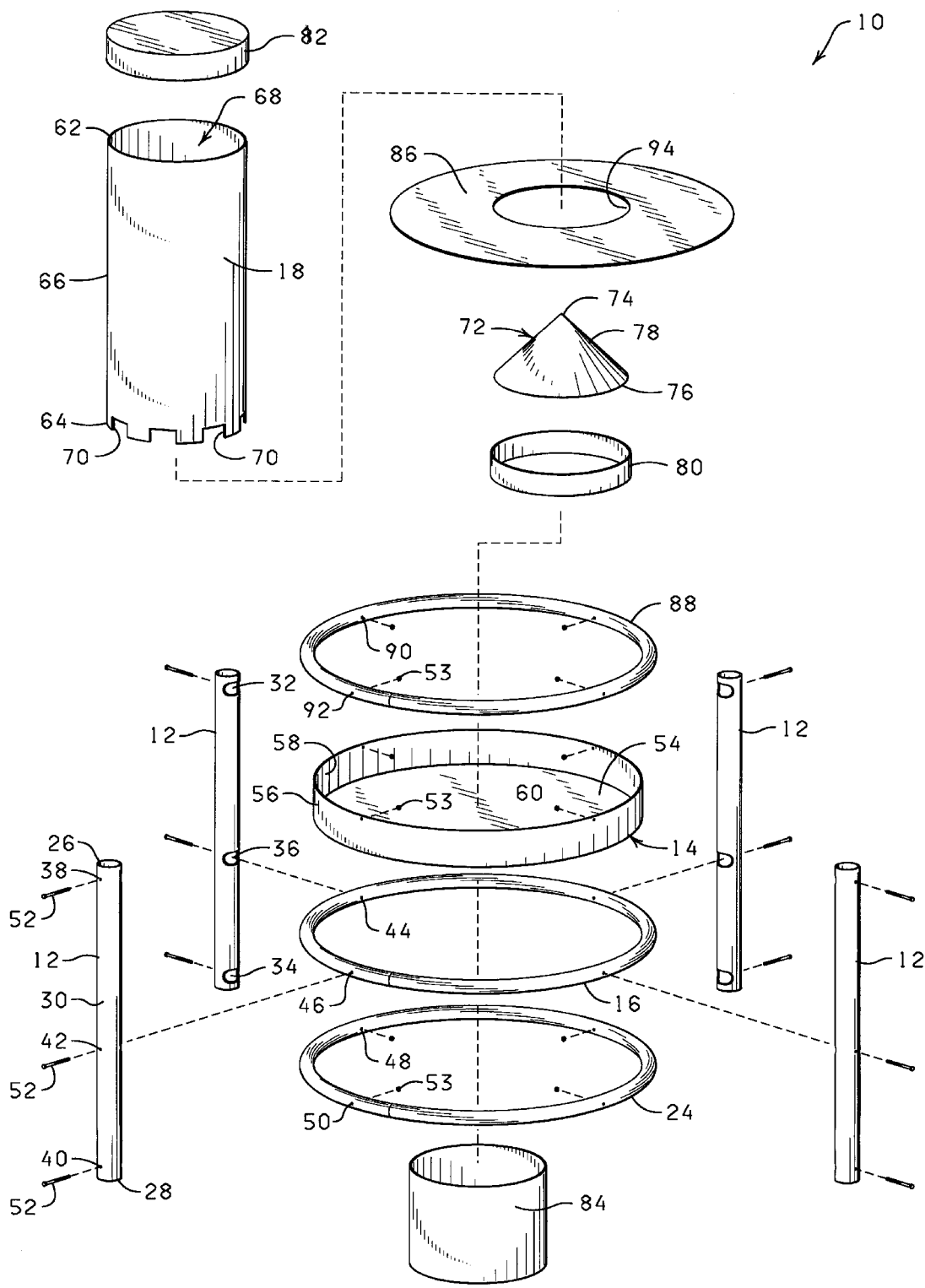

05,860,390

1

LIVESTOCK FEEDER

This application is a continuation of U.S. Ser. No. 08/605,407, filed Feb. 22, 1996, now U.S. Pat. No. 5,680,829.

BACKGROUND OF THE INVENTION

1. Field of the Invention

The present invention relates generally to livestock feeders, and more particularly, but not by way of limitation, to an improved feeder for feeding livestock salt, minerals, grains, and the like.

2. Brief Description of Related Art

Feeders for feeding livestock salt, grain, minerals and other pellatized foodstuffs are well known. Customarily, such feeders have been constructed of rigid materials, such as wood or metal. Such construction often results in the feeders becoming damaged or permanently deformed when engaged by an animal or during the transport of the feeder. It further results in the rotting of the wood, the formation of rust, the need for metal welding and for continually painting, and the development of sharp edges which can cause serious injury to an animal.

The construction of prior art livestock feeders further poses difficulty in the transport of such feeders and the preservation of feed contained in the feeder. More specifically, prior art livestock feeders are not easily disassembled for storage and transportation because they are either of unitary construction or configured of bulky components which are not easy to store and transport. In addition, such feeders are usually shaped so as to prevent the feeder from being moved from one location to another in a field or pasture by an individual without the feeder being susceptible to damage or permanent deformation. The construction of prior art livestock feeders also results in feed contained in the feeders being exposed to moisture which can cause the feed to solidify or cake and thus be nonconsumable by livestock.

To this end, a need has long existed for an improved livestock feeder which is resilient when engaged by livestock, easy to assemble and disassemble, easy to transport when either assembled or disassembled, and constructed to store and preserve a supply of feed. It is to such an improved livestock feeder that the present invention is directed.

BRIEF DESCRIPTION OF DRAWINGS

FIG. 1 is a perspective view of a livestock feeder constructed in accordance with the present invention.

FIG. 2 is an exploded, perspective view of the livestock feeder of FIG. 1.

FIG. 3A is a partial, perspective view of the livestock feeder of FIG. 1 illustrating the feed storage bin in a full open position.

FIG. 3B is a partial, perspective view of the livestock feeder of FIG. 1 illustrating the feed storage bin in a full closed position.

DETAILED DESCRIPTION

Referring now to the drawings and more particularly to FIGS. 1 and 2, shown is a livestock feeder 10 constructed in accordance with the present invention. The livestock feeder 10 is a self-standing feeder constructed to store and preserve a supply of feed and permit selective access to such feed by livestock. The term "feed" as used herein is to be understood to mean grains, conventional pellatized foodstuff, and animal feed supplements such as minerals, salt and the like. The livestock feeder 10 includes a plurality of spatially disposed leg members 12, a trough 14, a trough support ring 16, a feed storage bin 18, a roof assembly 20, and a base ring 24.

Referring to FIG. 2, each of the leg members 12 is a tubular member characterized as having an upper end portion 26, a lower end portion 28, and a medial portion 30. A retaining slot 32 is formed in each leg member 12 proximate the upper end portion 26, a retaining slot 34 is formed in each leg member 12 proximate the lower end portion 28, and a retaining slot 36 is formed in each leg member 12 at the medial portion 30 thereof. In conjunction with the retaining slots 32, 34, and 36, an aperture 38, an aperture 40, and an aperture 42 are formed through each leg member 12 such that the aperture 38 is axially aligned with the retaining slot 32, the aperture 40 is axially aligned with the retaining slot 34, and the aperture 42 is axially aligned with the retaining slot 36. The retaining slots 32, 34, and 36 are configured and sized to supportingly receive the roof assembly 20, the trough support ring 16 and the base ring 24, respectively.

To enhance the durability and portability of the livestock feeder 10, as well as to substantially eliminate the need for maintenance, the leg members 12 are desirably fabricated from a tubular polymeric material, such as polyethylene pipe. While the length, outer diameter, and wall thickness of the polyethylene pipe employed in the fabrication of the leg members 12 of the livestock feeder 10 can vary widely, desirable results can be obtained when the polyethylene pipe employed in the fabrication of each of the leg members 12 has a length of about four feet, an outer diameter of from about 3½ inches to about 4½ inches and a wall thickness of at least about ⅜ inch. It should be noted that the length of about four feet for the leg members 12 is particularly useful when the livestock feeder 10 is used to feed cattle. However, the length of the leg members 12 can be varied to accommodate various sized animals.

The trough support ring 16 and the base ring 24 are fabricated of a tubular polymeric material having resilient characteristics so as to permit the trough support ring 16 and the base ring 24 to be angularly deflected when significant pressures are exerted thereon, such as can be exerted by livestock, and thereafter restored to a substantially non-deflected position when such pressures are removed. The trough support ring 16 and the base ring 24 each have a substantially circular shape and are fabricated from a tubular polymeric material, such as polyethylene pipe. Desirable results can be obtained wherein the polymeric material employed in the fabrication of the trough support ring 16 and the base ring 24 is polyethylene pipe having an outer diameter from about 1⅝ inches to about 3 inches and a wall thickness from about 3/16 inch to about ⅜ inch.

The trough support ring 16 and the base ring 24 are each provided with a substantially unitary construction. That is, the trough support ring 16 and the base ring 24 are fabricated of the above described polyethylene pipe and formed into a circular configuration wherein the ends of the polyethylene pipe are secured together by any suitable means, such as heat welding, collars, nipples, adhesives, and the like.

To enhance retention of the trough support ring 16 and the base ring 24 in the retaining slots 36 and 34, respectively, of the leg members 12, as well as to stabilize the leg members 12 in a substantially upright, vertically disposed position, a plurality of spatially disposed apertures are formed through the trough support ring 16 and the base ring 24. More specifically, a plurality of apertures 44 are formed through the inner sidewall of the trough support ring 16 and a plurality of apertures 46 are formed through the outer sidewall of the trough support ring 16 in axial alignment with the apertures 44. Likewise, a plurality of apertures 48 are formed through the inner sidewall of the base ring 24 and a plurality of apertures 50 are formed through the outer sidewall of the base ring 24 in axial alignment with the apertures 48.

The axially aligned apertures formed through the opposed sidewalls of the trough support ring 16 and the base ring 24 are spatially disposed along the trough support ring 16 and the base ring 24 so that the apertures in the trough support ring 16 and the base ring 24 are aligned with the apertures formed through the leg members 12 when the trough support ring 16 and the base ring 24 are disposed in the retaining slots 36 and 34, respectively, of the leg members 12. The apertures 42 of the leg members 12 and the apertures 44 and 46 of the trough support ring 16 are sized to receive a connector member therethrough, such as a bolt 52. The bolt 52 is secured in the apertures 42, 44, and 46 with a nut 53 thereby securing the trough support ring 16 disposed within the retaining slots 36 to the leg members 12. Likewise, the aperture 40 in the leg members 12 and the apertures 48 and 50 in the base ring 24 are sized to receive a connector member therethrough, such as the bolt 52.

The trough 14 has a closed bottom end 54, a sidewall 56, and an open upper end 58. The bottom end 54 and the sidewall 56 cooperate to define a feed retaining space 60. The open upper end 58 permits access by livestock to feed disposed in the trough 14. The trough 14 preferably has a unitary, cylindrical configuration and is fabricated of a polymeric material, such as polyethylene.

The trough 14 is dimensioned such that the sidewall 56 of the trough 14 is securable to the trough support ring 16 with the trough 14 disposed in the trough support ring 16, as substantially shown in FIG. 1. The trough 14 is secured to the trough support ring 16 by any suitable means, such as heat welding, adhesive, fasteners and the like.

The feed storage bin 18 is preferably a cylindrical member fabricated of a tubular polymeric material, such as a polyethylene pipe. The feed storage bin 18 is characterized as having an open upper end 62, an open lower end 64, and a continuous sidewall 66 defining a feed retaining space 68. While the length, outer diameter, and wall thickness of the polyethylene pipe employed in the fabrication of the feed storage bin 18 of the livestock feeder 10 can vary widely, desirable results can be obtained when the polyethylene pipe employed in the fabrication of feed storage bin has a length of about 3½ to 4 feet, an outer diameter of from about 12 inches to about 24 inches and a wall thickness of at least about ½ inch. It should be noted that when the feed storage bin 18 has a length of 3½ feet and an outer diameter of 20 inches, the feed storage bin has a capacity of about 500 pounds of feed.

The feed storage bin 18 is provided with a plurality of feed dispensing openings or notches 70 near the lower end 64 thereof. The feed dispensing openings 70 are formed through the sidewall 66 and circumferentially spaced about the lower end 64 of the feed storage bin 18 so as to provide open communication between the feed retaining space 68 of the feed storage bin 18 and the feed retaining space 60 of the trough 14 about the feed storage bin 18 such that feed disposed in the feed retaining space 68 of the feed storage bin 18 is passable from the feed storage bin 18 into the feed retaining space 60 of the trough 14 via the feed dispensing openings 70 so as to be accessible by livestock.

As best shown in FIG. 1, the feed storage bin 18 is positioned in the trough 14 such that the lower end 64 of the feed storage bin 18 is secured to a central portion of the bottom end 54 of the trough 14 with the feed storage bin 18 extending upwardly from the trough 14 so as to be disposed in an upright position. The feed dispensing openings 70 are sized to permit gravitational flow of feed from the feed storage bin 18 into the trough 14. The lower end 64 of the feed storage bin 18 is secured to the bottom end 54 of the trough 14 by any suitable means, such as heat welding, adhesive, or the like.

The feed storage bin 18 is provided with a substantially conically-shaped feed guide 72 (shown in phantom in FIG. 1) disposed in the feed retaining space 68 of the feed storage bin 18 for guiding or directing the feed disposed in the feed retaining space 68 of the feed storage bin 18 radially outward toward the feed dispensing openings 70 of the feed storage bin 18 so that the feed disposed in the feed retaining space 68 of the feed storage bin 18 remains accessible to livestock even when the supply of feed in the feed retaining space 68 is low. The feed guide 72 is fabricated of a polymeric material so that it is resistant to corrosion and is characterized as having an apex end 74, a base end 76, and a sidewall 78 extending from the apex end 74 to the base end 76. The feed guide 72 is disposed in the feed retaining space 68 of the feed storage bin 18 and the base end 76 of the feed guide 72 is secured to the bottom end 54 of the trough 14 by heat welding or other suitable means so that the sidewall 78 of the feed guide 72 extends downwardly and outwardly from the apex end 74 to the base end 76 to cause feed disposed in the feed retaining space 68 of the feed storage bin 18 to flow radially toward the feed dispensing openings 70 of the feed storage bin 18.

To selectively regulate the rate at which feed is permitted to flow through the feed dispensing openings 70, the feed storage bin 18 is provided with a flow control member 80. As best shown in FIGS. 3A and 3B, the flow control member 80 is a polymeric band having a diameter that permits the flow control member 80 to be disposed about the feed storage bin 18 and moved between a full open position (FIG. 3A) wherein the feed dispensing openings 70 are unobstructed by the flow control member 80 so as to permit a maximum rate of flow of feed from the feed storage bin 18 into the trough 14 and a full closed position (FIG. 3B) wherein the passage of feed through the feed dispensing openings 70 is blocked. The band has a sufficient width to cover the feed dispensing openings 70 when the flow control member 80 is in the closed position to block the passage of feed from the feed storage bin 18.

Alternative devices can be used to regulate the flow of feed from the feed storage bin 18 into the trough 14. For example, a band having a plurality of openings corresponding to the feed dispensing openings 70 can be used. Such a band would be rotatably disposed on the lower end of the feed storage bin 18 so as to be rotatable between a full open position wherein the openings of the band are aligned with the feed dispensing openings 70 and a full closed position wherein the openings of the band are misaligned with the feed dispensing openings 70 of the feed storage bin 18 so as to block the flow of feed from the feed storage bin 18.

To use the livestock feeder 10, feed is placed in the feed storage bin 18 via the open upper end 58 of the feed storage bin 18. The upper end 58 of the feed storage bin 18 is then enclosed with a lid 82 to shelter the feed from moisture and thus preserve the feed. The lid is fabricated of a polymeric material and sized and shaped to fit over the upper end 58 of the feed storage bin 18.

Due to the substantial amount of feed the feed storage bin 18 is able to accommodate, it may be necessary to provided additional support to the trough 14 in order to support the weight of the feed. To this end, a lower support member 84 fabricated of a tubular polymeric material is secured to the underside of the bottom end 54 of the trough 14. The lower support member 84 is dimensioned such that the lower support member 84 extends between the bottom end 54 of the trough 14 and a support surface (not shown) in substantial alignment with the feed storage bin 18 to provide support to the trough 14. The lower support member 84 is shown herein to be fabricated of the same material from which the feed storage bin 18 is fabricated. That is, the lower support member 84 is fabricated of a polyethylene pipe. The lower support member 84 is secured to the underside of the bottom end 54 of the trough 14 by any suitable means, such as heat welding, adhesive or the like. The lower support member 84 preferably has a covered lower end (not shown).

The roof assembly 20 serves to shield feed disposed in the feed retaining space 60 of the trough 14 from weather elements, such as rain and snow and thereby preserve such feed, as well as further support the feed storage bin 18. The roof assembly 20 includes a cover plate 86 and cover plate support ring 88.

The cover plate support ring 88 is identical in construction to the trough support ring 16 and the base ring 24 described above. That is, the cover plate support ring 88 is fabricated of a tubular polymeric material having resilient characteristics so as to permit the cover plate support ring 88 to be angularly deflected when significant pressures are exerted thereon, such as can be exerted by livestock, and thereafter restored to a substantially non-deflected position when such pressures are removed. The cover plate support ring 88 has a substantially circular shape and is fabricated from a tubular polymeric material, such as polyethylene pipe. Desirable results can be obtained wherein the polymeric material employed in the fabrication of the cover plate support ring 88 is polyethylene pipe having an outer diameter from about 1⅝ inches to about 3 inches and a wall thickness from about 3/16 inch to about ⅜ inch.

The cover plate support ring 88 is provided with a substantially unitary construction. That is, the cover plate support ring 88 is fabricated of the above described polyethylene pipe and formed into a circular configuration wherein the ends of the polyethylene pipe are secured together by any suitable means, such as heat welding, collars, nipples, adhesives, and the like.

To enhance retention of the cover plate support ring 88 in the retaining slot 32 of the leg members 12, a plurality of spatially disposed apertures are formed through the cover plate support ring 88. More specifically, a plurality of apertures 90 are formed through the inner sidewall of the cover plate support ring 88 and a plurality of apertures 92 are formed through the outer sidewall of the cover plate support ring 88 in axial alignment with the apertures 90.

The axially aligned apertures formed through the opposed sidewalls of the cover plate support ring 88 are spatially disposed along the cover plate support ring 88 so that the apertures in the cover plate support ring 88 are aligned with the apertures formed through the leg members 12 when the cover plate support ring 88 is disposed in the retaining slots 32 of the leg members 12. The apertures 38 of the leg members 12 and the apertures 90 and 92 of the cover plate support ring 88 are sized to receive a connector member therethrough, such as the bolt 52, for securing the cover plate support ring 88 to the leg members 12.

The cover plate 86 is fabricated from a polymeric sheet of material having a centrally disposed opening 94 sized to receive the feed storage bin 18. The cover plate 86 is substantially circularly shaped so that the outer periphery of the cover plate 86 can be secured to the cover plate support ring 88. The retaining slots 32 of the leg members 12 are sufficiently spaced apart from the retaining slots 36 of the leg members 12 so that the roof assembly 20 is disposed a distance above the trough 14 so as to provide shelter for the trough 14 while permitting access to the trough 14 by livestock. The cover plate 86 is secured to the cover plate support ring 88, as well as the feed storage bin 18, by any suitable means, such as heat welding, adhesive, or the like. Moreover, the cover plate 86 is secured to the cover plate support ring 88 and the feed storage bin 18 so that the cover plate 86 slopes downwardly from the feed storage bin 18 to the cover plate support ring 88 to prevent accumulation of water and debris on the cover plate 86.

The use of polymeric material to construct the livestock feeder 10 substantially eliminates problems associated with the livestock feeder 10 becoming permanently deformed when engaged by an animal or otherwise, eliminates sharp edges, it will not rust or corrode, it will not break or split if water gets in the tubes and freezes, it eliminates the need for continual painting, and it eliminates the need for metal welding. Furthermore, the moisture resistant properties of polymeric materials aid in the preservation of feed stored in the livestock feeder 10. The use of polymeric material to construct the livestock feeder 10 further enhances the durability and portability of the livestock feeder 10. That is, the livestock feeder 10 can be readily assembled and disassembled for transportation from one location to another. Alternatively, the durability of the construction of the livestock feeder 10 and the substantial cylindrical shape of the livestock feeder 10 permits the livestock feeder 10 to be turned on its side, when empty of feed, and rollingly transported from one location to another in a field or pasture without concern of damaging the livestock feeder 10. The cylindrical shape of the livestock feeder 10 also enables the livestock feeder 10 to accommodate more heads of livestock than prior art livestock feeders and the significant feed capacity of the livestock feeder 10 prevents livestock from having a tendency of turning the livestock feeder 10 over on its side and spilling feed onto the ground.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed:

1. A livestock feeder, comprising:
   a plurality of leg members having an upper end portion and a lower end portion;
   a trough having a closed bottom end, a sidewall, and an open upper end, the trough connected to the leg members with the leg members circumferentially spaced about the trough for supporting the trough a distance above the lower end portion of the leg members;
   a cylindrically shaped lower support member having one end secured to the underside of the bottom end of the trough and an opposing end disposed in a substantially coplanar relationship with the lower end portion of the legs so as to cooperate with the leg members to support the trough; and a feed storage bin having an upper end, a lower end, and a continuous sidewall, the feed storage bin extending upwardly from the trough with the lower end of the feed storage bin disposed on the bottom end of the trough, the feed storage bin having at least one feed dispensing opening formed through the sidewall near the lower end of the feed storage bin, the feed dispensing opening sized to permit gravitational flow of feed from the feed storage bin into the trough via the feed dispensing opening whereby such feed is accessible to livestock.

2. The livestock feeder of claim 1 further comprising:

flow control means for selectively regulating the flow of feed from the feed storage bin to the trough via the feed dispensing opening.

3. The livestock feeder of claim 2 wherein the flow control means comprises:

a polymeric band disposed on the feed storage bin so as to be variably movable between a full open position wherein the feed dispensing opening is unobstructed by the band to permit a maximum rate of flow of feed from the feed storage bin into the trough via the feed dispensing opening and a full closed position wherein the flow of feed through the feed dispensing opening is blocked.

4. The livestock feeder of claim 1 further comprising:

a cover plate secured to the leg members such that the cover plate is disposed a distance above the trough so as to cover the trough while permitting access to the trough by livestock, the cover plate having a diameter greater than or equal to the diameter of the trough and being sloped downwardly from a central portion of the cover plate to the outer periphery thereof to prevent accumulation of water and debris thereon.

5. The livestock feeder of claim 1 further comprising:

feed guide means disposed in the feed storage bin for guiding feed disposed in the feed storage bin to the feed dispensing opening.

6. The livestock feeder of claim 1 further comprising:

a base ring constructed of a tubular polymeric material, the base ring connected to the lower end portion of each leg member so as to encircle the lower support member.

7. The livestock feeder of claim 1 wherein the leg members, the trough, the lower support member, and the feed storage bin are each fabricated of a polymeric material.

8. The livestock feeder of claim 1 wherein the lower support member is substantially aligned with the feed storage bin.

9. A livestock feeder, comprising:

a trough having a closed bottom end, a sidewall, and an open upper end;

a feed storage bin having an upper end, a lower end, and a continuous sidewall, the feed storage bin extending upwardly from the open upper end of the trough with the lower end of the feed storage bin disposed on the bottom end of the trough, the feed storage bin having at least one feed dispensing opening formed through the sidewall near the lower end of the feed storage bin, the feed dispensing opening sized to permit gravitational flow of feed from the feed storage bin into the trough via the feed dispensing opening whereby such feed is accessible to livestock; and a cylindrically shaped support member extending downwardly from the bottom end of the trough for supporting the trough and the feed storage bin in an upright position.

10. The livestock feeder of claim 9 wherein the trough, the support member, and the feed storage bin are each fabricated of a polymeric material.

11. The livestock feeder of claim 9 wherein the feed storage bin is cylindrically shaped and wherein the lower support member is substantially aligned with the feed storage bin.

12. The livestock feeder of claim 9 further comprising:

flow control means for selectively regulating the flow of feed from the feed storage bin to the trough via the feed dispensing opening.

13. The livestock feeder of claim 9 wherein the flow control means comprises:

a polymeric band disposed on the feed storage bin so as to be variably movable between a full open position wherein the feed dispensing opening is unobstructed by the band to permit a maximum rate of flow of feed from the feed storage bin into the trough via the feed dispensing opening and a full closed position wherein the flow of feed through the feed dispensing opening is blocked.

14. The livestock feeder of claim 9 further comprising:

a cover plate secured to the leg members such that the cover plate is disposed a distance above the trough so as to cover the trough while permitting access to the trough by livestock, the cover plate having a diameter greater than or equal to the diameter of the trough and being sloped downwardly from a central portion of the cover plate to the outer periphery thereof to prevent accumulation of water and debris thereon.

15. The livestock feeder of claim 9 further comprising:

feed guide means disposed in the feed storage bin for guiding feed disposed in the feed storage bin to the feed dispensing opening.

* * * * *